US006496626B2

(12) United States Patent
Spagnoletti et al.

(10) Patent No.: US 6,496,626 B2
(45) Date of Patent: Dec. 17, 2002

(54) TELECOMMUNICATIONS SYSTEM POWER SUPPLY

(75) Inventors: Robert Spagnoletti, Herts (GB); Julian Fells, Epping (GB); Ian Hardcastle, Harlow (GB); Garry Adams, Great Dunmow (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/745,887

(22) Filed: Dec. 21, 2000

(65) Prior Publication Data

US 2002/0081081 A1 Jun. 27, 2002

(51) Int. Cl.[7] .............................. G02B 6/50; H02B 1/24
(52) U.S. Cl. ........................ 385/101; 307/43; 307/112
(58) Field of Search ........................... 385/101; 307/43, 307/112

(56) References Cited

U.S. PATENT DOCUMENTS

| 4,678,270 A | * | 7/1987 | Gunn et al. ............... 385/138 |
| 4,761,831 A | * | 8/1988 | Davis et al. ............... 359/141 |
| 4,836,641 A | * | 6/1989 | Priaroggia ................ 385/100 |
| 5,214,312 A | * | 5/1993 | Inoue ........................ 307/43 |
| 5,334,879 A | * | 8/1994 | Inoue et al. ............... 307/112 |
| 6,025,949 A | * | 2/2000 | Anderson ................. 359/179 |
| 6,157,098 A | * | 12/2000 | Kojima et al. ............ 307/139 |
| 6,163,084 A | * | 12/2000 | Yamaguchi .............. 307/38 |

FOREIGN PATENT DOCUMENTS

JP 404023622 * 1/1992

OTHER PUBLICATIONS

The Asia Pacific Cable Network (David R Gunderson, Antoine Lecroart, Koichi Tatekura) IEEE Communications Magazine, Feb. 1996.

* cited by examiner

Primary Examiner—Tulsidas Patel
Assistant Examiner—Michael C. Zarroli
(74) Attorney, Agent, or Firm—Lee, Mann, Smith, McWilliams, Sweeney & Ohlson (57) ABSTRACT

An underwater telecommunications system has a first underwater cable for carrying data traffic, one or more underwater repeaters, and an underwater power network for supplying power to the repeaters. By providing a separate cable for some or all of the power supply, the power route may be made shorter, thus more power can be delivered, therefore more repeaters can be used, which enables more fiber pairs to be laid, and thus the capacity to be increased.

15 Claims, 12 Drawing Sheets

TELECOMMUNICATIONS SYSTEM POWER SUPPLY

RELATED APPLICATIONS

This application relates to co-pending U.S. patent application Ser. No. 09/745,888 entitled TRANSMISSION SYSTEM WITH ENHANCED REPEATERS, filed on the same date, and hereby incorporated by reference.

FIELD OF THE INVENTION

The invention relates to underwater telecommunications systems, underwater power networks for supplying power to underwater equipment, to underwater repeaters, to methods of installing such apparatus, and to methods of upgrading such apparatus.

BACKGROUND TO THE INVENTION

It is known to provide telecommunications systems having equipment underwater for various purposes.

One application is for data transmission between land sites separated by water. Other applications include telemetry or monitoring of underwater installations for other purposes. Conventional underwater data transmission systems started with metallic conductors arranged in a coaxial cable. Fibre optic transmission systems were later introduced. For spans beyond several hundred kilometers, repeaters were required. These started with optical to electrical to optical regenerators. In the 1990's, optical amplifier systems were introduced, to avoid the conversion into the electrical domain.

In corresponding terrestrial optical data transmission systems, the capacity has been steadily increasing, as data rates have increased up to 10 G bits per second, and the number of channels wavelength multiplexed together on the same fibre, has increased into the hundreds. A typical terrestrial fibre route is laid with 48 pairs of fibres, many of the fibres being unused initially, but laid to allow for future expansion.

Underwater systems have not matched the growth in capacity of such terrestrial systems. The two primary reasons are the limitation in the amount of power which can be fed to underwater repeaters, such as optical amplifiers or regenerators, and the extremely high reliability requirements for such underwater equipment. The reliability is required because the underwater equipment is so inaccessible for maintenance or repair, once installed. In particular, optical pumps for optical amplifiers may be responsible for much of the power consumption, e.g. in the order of 50%. Notably, these components may be amongst the least reliable, depending on the pump power level and other factors. For a long haul system requiring many optical amplifiers, every 50 to 100 kilometers, the power for each of these optical amplifiers is supplied along the same cable as contains the fibres for carrying the data. Typically, each repeater housing, containing one optical amplifier for each fibre, uses 0.5 to 1.5 amps, and drops in the region of 30 to 50 volts. Each of the amplifiers are connected in series along the cable.

Thus for a transoceanic route of thousands of Kilometers, the total voltage drop will run into thousands of volts for the optical amplifiers. The voltage drop caused by losses in the copper power conductor between optical amplifiers maybe in the same order of magnitude.

If the losses in the copper are reduced by using thicker copper, the weight of the cable increases prohibitively. If more repeaters are added, the total voltage drop increases, and the insulation of the cable and the repeaters, to withstand such high voltages, becomes prohibitively heavy.

For these reasons, often only 8 to 12 fibre pairs are installed in the cable, because it is impossible to supply more power for sufficient optical amplifiers for more fibres. Efforts to improve the capacity have involved trying to reduce the power consumption of each optical amplifier, by using more efficient optical pumps, and using more power efficient semiconductors for the control electronics.

An example of a power supply network for an underwater transmission system is shown at pages 44–46 IEEE Communications Magazine February 1996.

SUMMARY OF THE INVENTION

An object of the invention is to address at least some of the above limitations. According to a first aspect of the invention, there is provided an underwater telecommunications system having a first underwater cable for carrying data traffic, one or more underwater repeaters coupled to the first cable, and an underwater power network coupled to the repeaters for supplying power from a remote power source, to the repeaters, at least part of the power network extending along a second underwater cable, separate from the first cable.

Several advantages can arise from providing a separate cable for some or all of the power supply. Firstly it enables the routing of the cable for data traffic and of the second cable for power supply, to be independently optimised. In particular the power route may be made shorter or multiple power feeds used. This enables more power to be delivered to the repeaters, which enables more repeaters, more functionality in the repeaters, and more fibre pairs. More functionality in each repeater can enable more capacity (through more channels and/or higher data rates per channel).

Thus if for example the nearest land to the midpoint of the data route is not at the data terminals, then the route for the second cable carrying power, may be shorter than the data route. If there is a string of repeaters spread along the data route, it becomes possible to route power directly to repeaters in the middle of the string rather than being restricted to supplying it through all the repeaters in series. Thus a critical limitation of the prior art can be overcome, with very significant implications for overall system performance, capacity and costs.

Alternatively, or as well, the electrical voltage and or current can be reduced, and thus cause the weight of insulation material and or the weight of copper in any cable used for power supply, to be reduced, thus reducing cost and easing installation.

A second advantage is that separate cables can be maintained or upgraded independently. Thirdly, different levels of redundancy can be provided for the separate cables. Fourthly, different levels of mechanical strength can be designed, as appropriate for each cable.

An preferred example has the cable for carrying the data having at least one optical fibre for carrying the data.

Another preferred example has a transmitting data terminal on land or surface at one end of the first cable, and a receiving data terminal on land or surface, at the other end.

In another preferred example, power is supplied along both cables. This can enable the second cable to supply power to many repeaters along the first cable, or provide redundancy of power supply.

Another preferred example has a string of repeaters at intervals along the first cable, the power network being coupled to supply power at one or more intermediate locations along the string, to divide the string into two or more separately powered substrings. This has the advantage that each of the substrings may be shortened and thus more power can be delivered to each substring, and the data carrying capacity increased. Alternatively, or as well, the length of the cable can be increased.

In another preferred example, power supply in one substring can be supplemented or replaced by supplies to neighbouring substrings. This enables provision for redundancy to be built in, to improve reliability against failures such as cable cuts. Also, it enables provision for upgrading to deliver more power to selected substrings.

Another preferred example has two or more data carrying cables, the second cable being coupled to supply power to repeaters in the data carrying cables. This enables more significant cost advantages to be achieved by reducing the number of power cables required.

Another preferred example has a coupling arrangement for enabling power to be coupled from the second cable to the repeater or repeaters after either cable has been laid underwater. This may ease installation, and allow later upgrade or expansion to be carried out.

In another preferred example the coupling arrangement has one or more tails branched off the first or the second cable. This can ease installation, or ease later upgrade or expansion, because it is easier to splice to a tail than splice into a cable.

Another preferred example has a tail for coupling the power from the second cable to the repeaters of the first cable, the second cable and the first cable each having a branch to couple the tail. This is a preferred alternative to a four way junction box because it keeps the cables more independent, which may ease installation and upgrading, and because branching technology is tried and tested.

Another preferred example is arranged such that at least some of the repeaters are coupled to the second cable to receive all their power from the second cable such that no power need be transmitted along at least some parts of the first cable. This can enable part or all of the first cable to be constructed of lighter cable.

In another preferred example, the second cable has a series of junction boxes at intervals, arranged to allow more repeaters to be coupled after installation of the second cable.

Another preferred example has the power network being coupled to the first cable at two or more locations and arranged to provide redundancy such that a failure of supply can be compensated by adjusting the power supply at any of the two or more locations.

A second aspect of the invention provides an underwater power network for supplying power to underwater repeaters of the above mentioned telecommunication system, the power network comprising a power terminal on land or surface, and the second cable extending underwater form the power terminal, separate from the first cable for carrying data, and having coupling assemblies for coupling power to the repeaters.

A preferred example of the power network has the second cable being arranged to supply power to repeaters on two or more cables carrying data traffic.

Another preferred example has further second cables for supplying power to different locations along the first cable.

A third aspect of the invention provides an underwater repeater for transmitting data traffic along cables in a telecommunications system, the repeater having three or more cable couplings, two of the cable couplings arranged to carry the data traffic, a third of the cable couplings arranged to couple power to the repeater, not the data traffic.

A fourth aspect of the invention provides an underwater telecommunications system having a first underwater cable for carrying data traffic, underwater telecommunications equipment coupled to the first cable, and an underwater power network coupled to the underwater equipment, for supplying power to the equipment from land or surface, along a second underwater cable, separate from the first cable. Corresponding advantages apply to equipment other than repeaters.

A fifth aspect of the invention provides a method of using the above mentioned system to transmit data traffic, comprising the step of passing the data traffic to a terminal of the system for transmission over the system.

A sixth aspect of the invention provides a method of installing the above mentioned system, comprising the step of laying the first and second cables separately, and the step of coupling the second cable to enable it to supply power to the repeaters.

A seventh aspect of the invention provides a method of upgrading the system, comprising the steps of laying a further first cable, and coupling the further cable to the second cable to enable power supply from the second cable to the repeaters of the further first cable.

An eighth aspect of the invention provides an underwater telecommunications system having a first underwater cable for carrying data traffic, one or more underwater repeaters coupled to the first cable, and one or more power couplers for coupling a second underwater cable for supplying power from a remote power source to the repeaters.

A preferred example has the power couplers comprising a tail extending from the repeater, for splicing to the second underwater cable.

Any of the preferred features may be combined with any of the above mentioned aspects of the invention, as would be apparent to a skilled person. Other advantages may become apparent to a skilled person, particularly in comparison to other prior art of which the inventors are unaware.

DETAILED DESCRIPTION OF INVENTION

Embodiments of the invention will now be described in more detail. They illustrate the invention by way of example, and the scope of the invention is not limited to these examples.

FIG. 1

Figure 1:
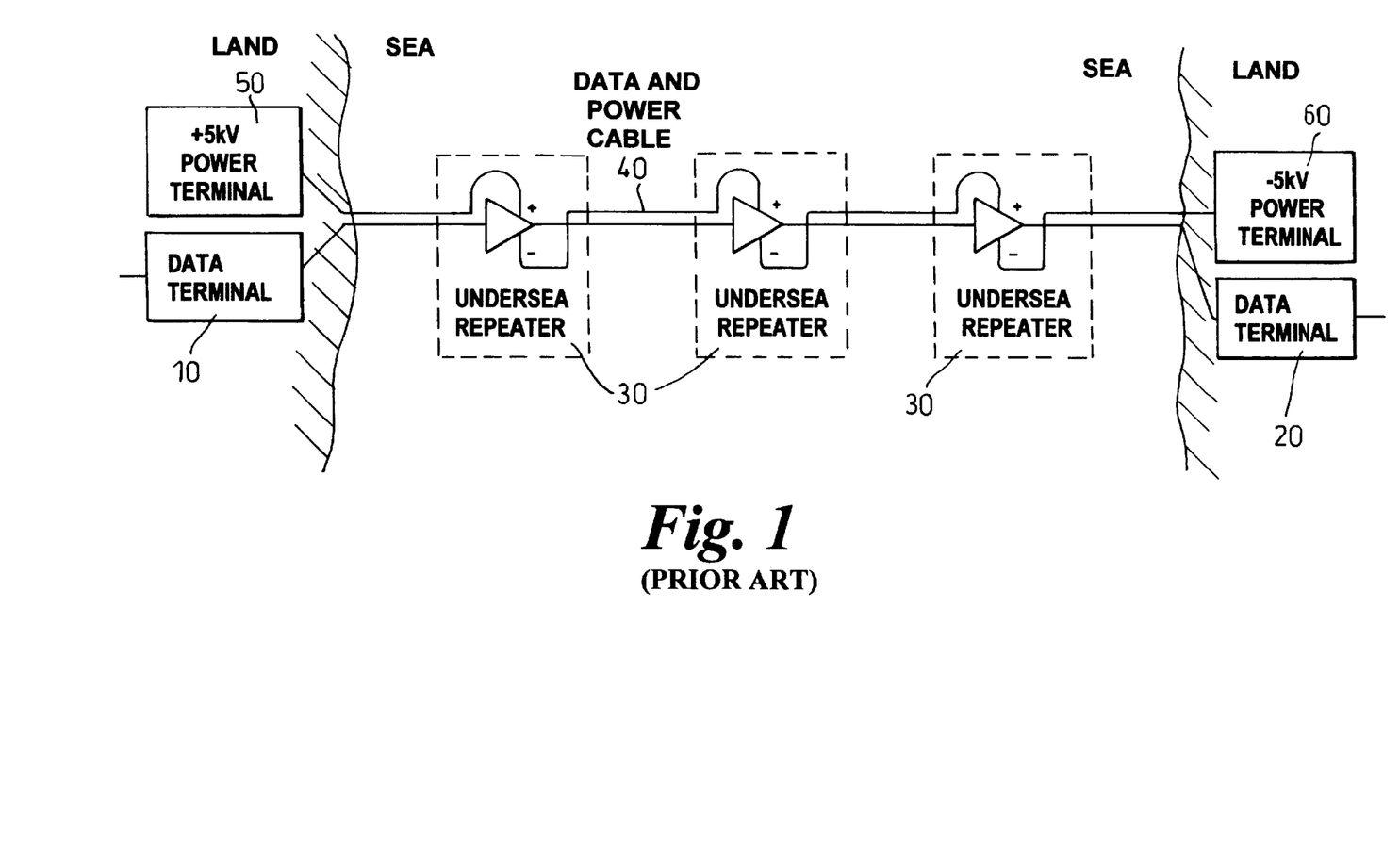
FIG. 1 shows a prior art under sea transmissions having a number of repeaters.

FIG. 1 shows a prior art under sea data transmission system in which data is sent from a first data terminal 10 to a second data terminal 20, via under sea repeaters 30. Such repeaters require a power supply. Accordingly, such a system is known as a powered system. Electric power is fed from the same cable 40, as is used by the data. The repeaters are connected in series along the cable. A proportion of the voltage is dropped by each repeater, and in a typical case where the cable stretches for 50–100 kilometers between repeaters, a considerable proportion of the voltage is dropped by losses in the cable.

Accordingly, at power terminals 50, 60 at each end of the cable, a voltage source of several thousand volts is required. This is usually a DC supply, which may be converted from a local terrestrial AC power grid. Appropriate back up generators may be provided.

Although for the sake of clarity, only one data path in one direction is shown, in practice there would be many data paths, going in both directions. Therefore each under sea repeater housing would typically contain 8–12 optical amplifiers or optical to electrical regenerators. Within each repeater housing, the 8–12 repeaters may be powered in series or parallel, or in various combinations of series and parallel, to achieve an appropriate distribution of current and voltage drop for each individual amplifier or regenerator, as desired.

FIG. 2

Figure 2:
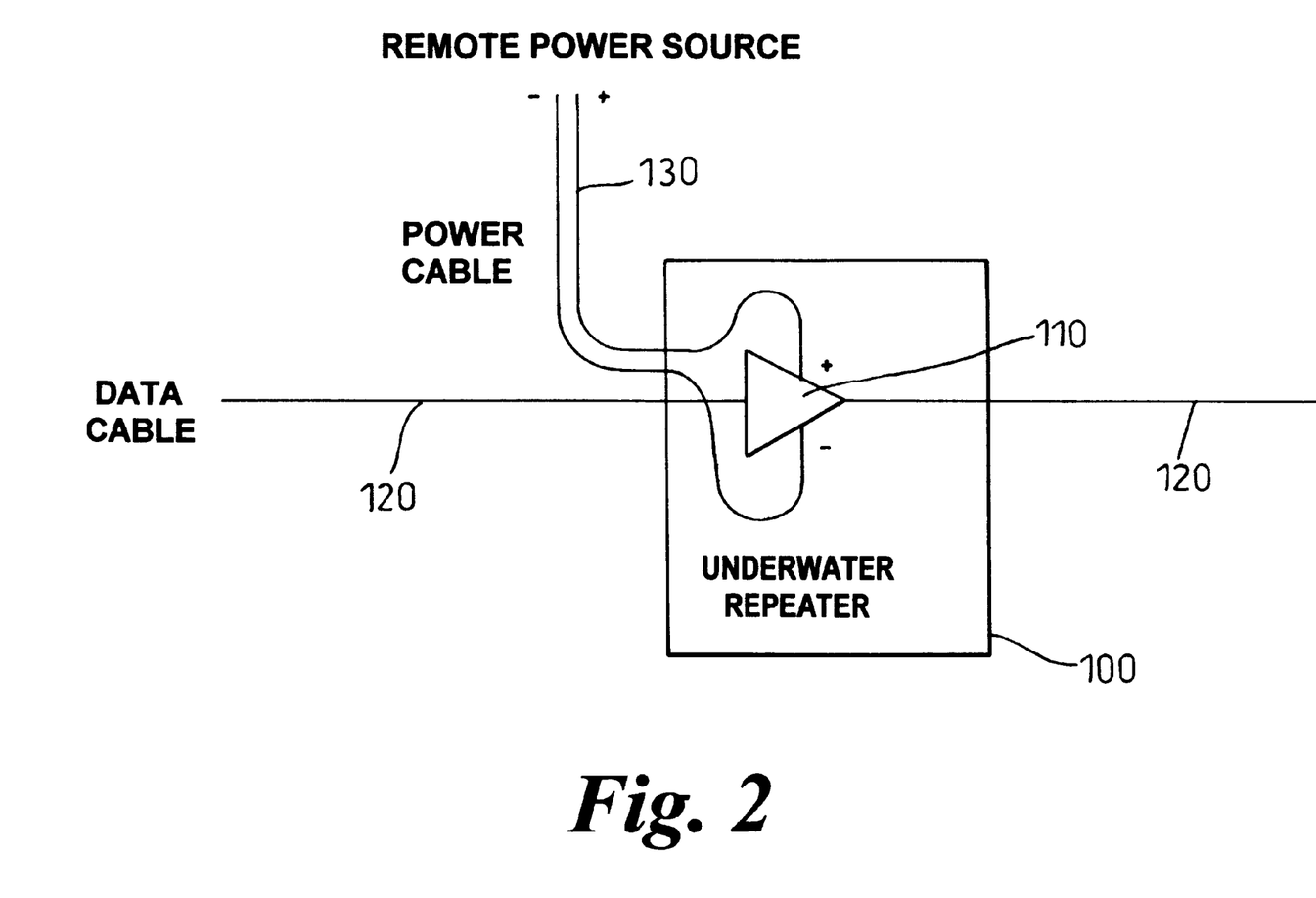
FIG. 2 shows an embodiment of the invention with separate power and data cables to an underwater repeater.

FIG. 2 shows an embodiment of the invention including an underwater repeater housing 100, an individual repeater 110, a first cable for carrying data 120, and a second cable 130 for carrying power. By using a separate power cable, considerably more power can be supplied to the repeater housing, which enables the advantages mentioned above to be realised.

In the context of the invention, the term "repeater" in intended to encompass one or more optical amplifiers, single direction or bi-directional optical amplification, distributed optical amplification, such as Raman amplification, where is the amplifying action may take place along the transmission fibre, not only within the repeater housing, and any type of signal regeneration. Typically the signal regeneration is carried out after 10–20 spans of optical amplification, though longer distances between regeneration are desirable, and are being developed. The signal regeneration may involve separating a WDM signal into constituent wavelengths, and regenerating each wavelength, or each channel, individually. The regeneration may involve reshaping, retiming, and amplifying to increase the amplitude, singly or any combination of these. It may involve conversion of an optical signal into electrical domain, or may be carried out in part or in whole in the optical domain.

FIG. 2 shows an outward and return path for the power along the power cable. Other arrangements are possible. The return path may be routed along the data cable, or along another separate power cable (not illustrated) or be terminated at a sea earth at the repeater of elsewhere.

FIG. 3

Figure 3:
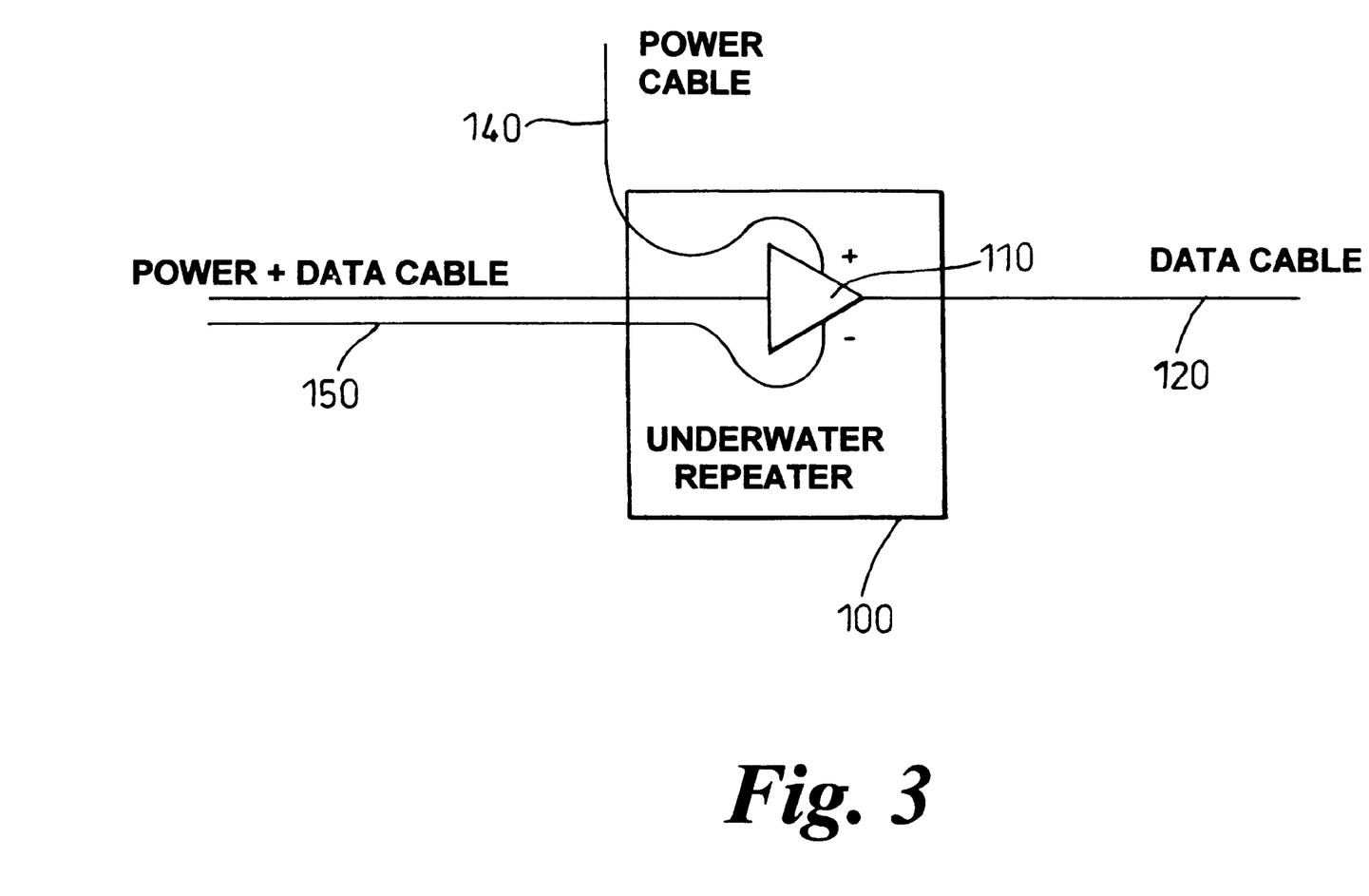
FIG. 3 shows another embodiment of the invention showing separate power and data cables going to an underwater repeater.

FIG. 3 shows another embodiment in which the supply to the repeater 110 is fed along the second cable 140, and the return is fed along the incoming data cable 150. An advantage of this arrangement is that if a single power line is fed along a cable, less insulation is required in that cable than if two power lines were included in the same cable.

FIG. 4

Figure 4:
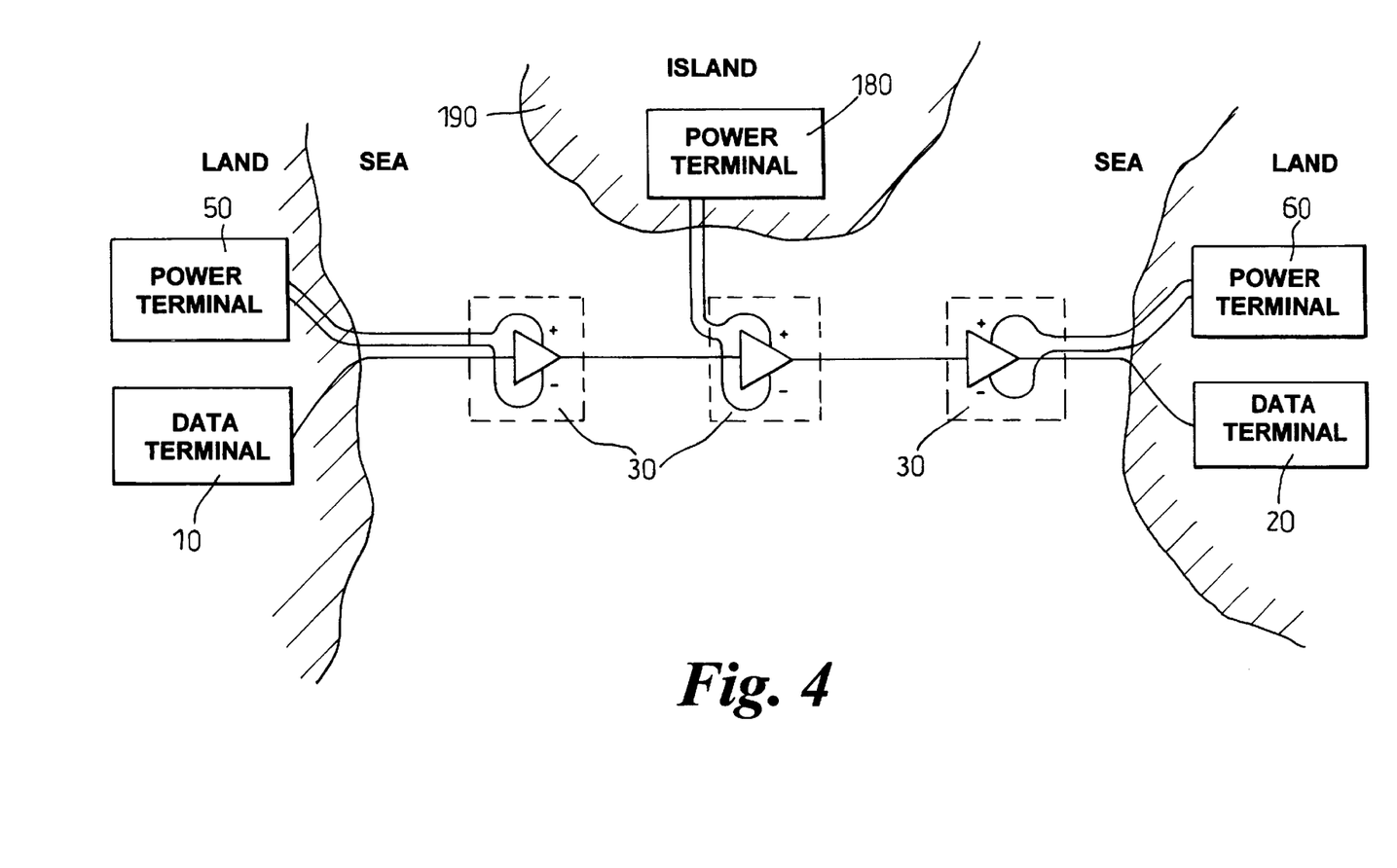
FIGS. 4 and 5 show embodiments of the invention in the form of transmission systems between land terminals.

FIG. 4 shows another embodiment of the invention, showing a complete data transmission system. Similar reference numerals are used to those used in FIG. 1. An additional power terminal 180 is shown for supplying power to an intermediate one of the repeaters. As shown, this enables the power supply routing to be shortened, and thus more power can be delivered to at least some of the repeaters. The repeater closest to each of the data terminals are supplied by power fed along the data cable. The data route takes the shortest path between the data terminals, rather than going via the island 190. However, the routing for the power supply is optimised by providing a separate power cable for at least some of the repeaters.

At least some of the cable for carrying the data carries no power. These sections of the cable can be made much lighter, because no power conductor is required, and less insulation is needed. The most significant benefit is likely to be the increase in data capacity enabled by the increase in power supply to the repeaters. Although in FIG. 4 the return current path for each power supply is shown going back to the same power terminal as the source, other possibilities will be apparent, and may be preferred, such as Sea earth, or separate cables to other power terminals.

FIG. 5

Figure 5:
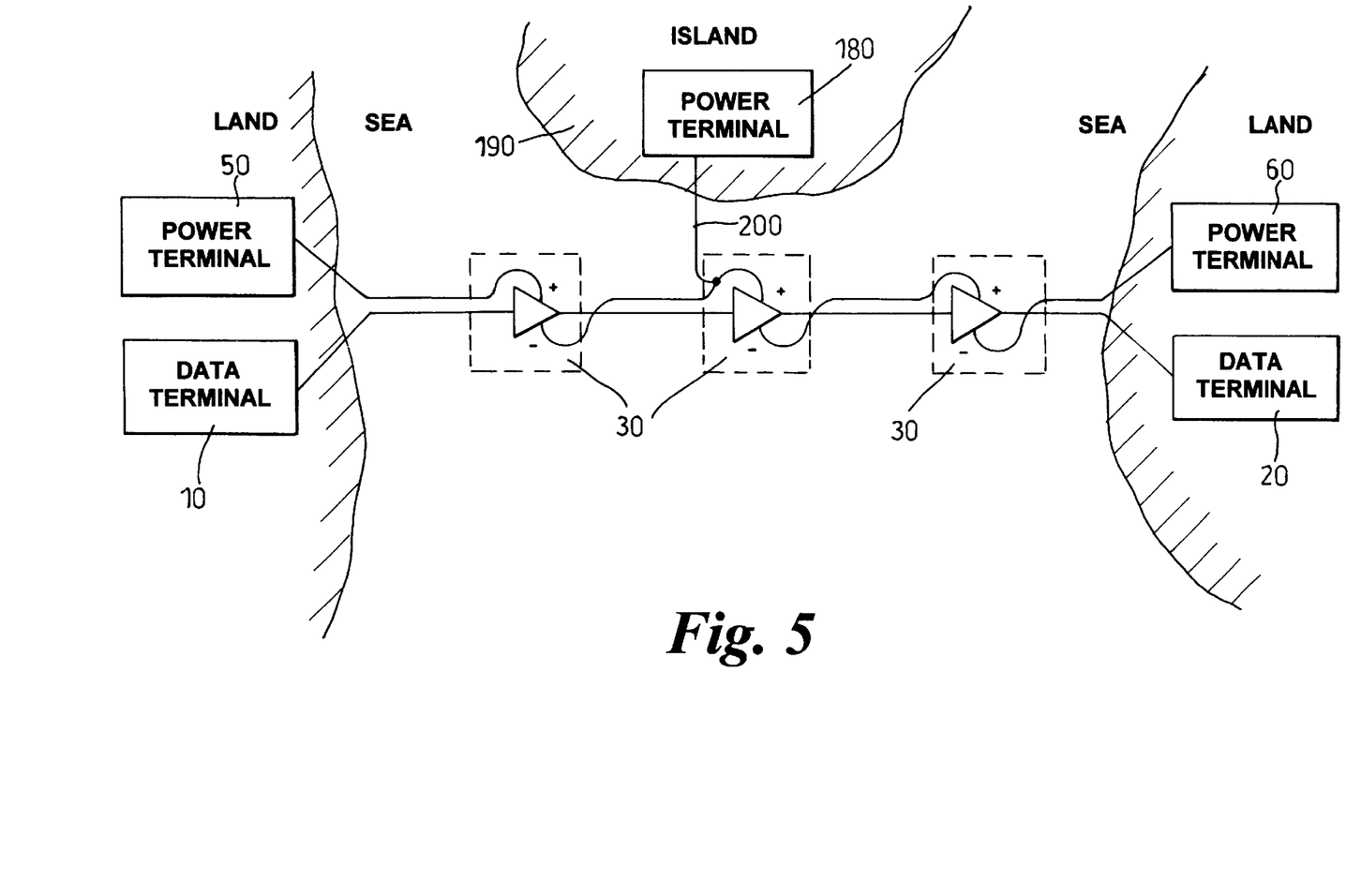

FIG. 5 shows another embodiment. Again, similar reference numerals to those of FIG. 1 have been used. In this case, the power supply is arranged to run along the data cable, with the repeaters connected in series, and with additional power supply feed 200, coupled to an intermediate location along the data cable. This separate power cable is fed from intermediate power terminal 180 shown on an island, but could conceivably be supplied from a floating platform, or a semi-submersible location, such as an oil rig.

This configuration enables various different supply arrangements to be used. It could be arranged so that the power terminals at each end of the data cable are both of the same polarity and the island power terminal 180 could be of the opposite polarity, sinking or sourcing current from both of the other terminals. This would effectively divide the string of repeaters in to two substrings. One substring extends from the intermediate location to one of the data terminals, the other substring extending from the intermediate location to the other data terminal. The voltage drop along each substring could be nearly the same as the voltage drop along the entire string of repeaters shown in FIG. 1. Of course there would be some voltage drop through losses along the separate power cable 200. However, this cable can be made as short as possible, and as it carries no fibres, and is dedicated to carrying power, it can be constructed with more conductor material, to reduce the losses if desired.

The arrangement of FIG. 5 would also allow the island power terminal 180 to simply feed additional current into an arrangement where the power terminals at each end of the data cable are at opposite polarities. This might be appropriate if the island power terminal or its power cable 200 were not suitable for handling the high voltages or high currents of the above mentioned arrangement. It might be appropriate if one or more of the intermediate repeaters is arranged to use more power than the others. This might be the case if it is arranged to have additional functionality such as signal regeneration, as discussed above.

However the polarities voltage levels of the terminals are arranged, it is clearly possible to have more than one of these island power terminals feeding intermediate locations along the data cable. This may enable longer data routes, or more power to the repeater housings, and therefore enable more capacity. Accordingly, it is conceivable that the voltage level along the data route could go down along the first substring, up along a subsequent substring, and down again along a third substring, and so on.

FIG. 6

Figure 6:
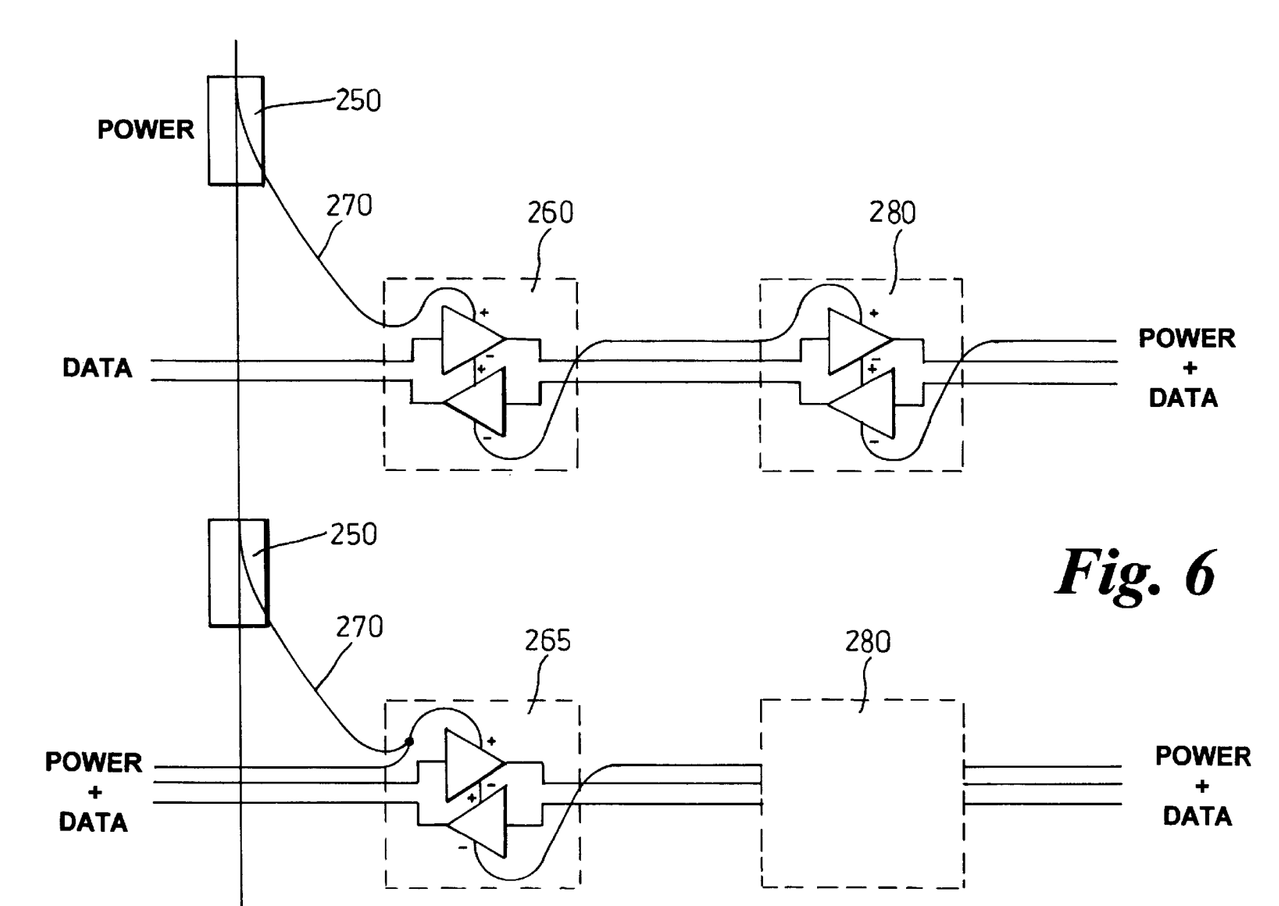
FIG. 6 shows another embodiment of the invention showing an arrangement for coupling a power cable to more than one data cable.

FIG. 6 shows an arrangement in which the power cable is connected to more than one data cable. The power cable is shown laid transversely to the data cables. Other arrangements are possible, such as a diagonal relationship, or the power cable running parallel with one of the data cables then crossing over to run parallel with the other data cable. At points where the power cable is adjacent or crosses over the data cable, it would be possible to construct a four way intersection casing. However, as illustrated, it may be preferable to couple the power cable to the data cable using three way casings on each of the cables. A three way casing 250 on the power cable is joined to a three way casing 260 on the data cable by a "tail" cable 270.

In FIG. 6, the three way casing on the data cable includes a repeater. It would of course be possible to use a three way casing without a repeater, but at the expense of increasing the number of casings, which may increase the costs. The repeaters 260, 265, 280 shown in FIG. 6 are illustrated as bi-directional repeaters, with the power supplies connected in series. Other repeaters along the data cable may be contained in conventional two way casings, 280, rather than the three way casings provided at the intersections with the power cable.

Depending on the requirements of the rest of the repeaters on the data cable, (not shown), the power route may follow the data cable in one or both directions of the data cable, or not at all (not shown in FIG. 6). In the latter case, the return path for the power supply current may be via a sea earth, or may retrace its route back along the tail 270 to the power cable.

FIG. 6 shows by way of example one data cable with a power route extending along in only one direction away from the transverse power cable, and one data cable having a power route extending in both directions. In the former case, the repeater closest to the power cable, 160, has a power route passing through with no power branch. Where the power route extends in both directions along the data cable, as illustrated in the lower of the two data cables, the repeater 265 closest to the transverse power cable, has a power branch. This may be switched or a permanent connection, as desired. The switch could be remotely controlled from land, via a service channel, which can be implemented in various ways as would be well known to a skilled person.

Although only one amplifier or regenerator is shown in each repeater, of course there would be many others (not shown, for the sake of clarity), at least one for each fibre, and in a multiplexed system, one for each channel.

A typical construction of such a three way housing will be described in more detail below with reference to FIGS. 9 and 10. A three way housing is preferred over a four way housing, firstly to enable the two cables to be laid independently, and secondly because three way casings are already well known for underwater systems such as transatlantic cables with one branch to the United Kingdom and another to France.

The length of the tails 270 could be relatively short, a few meters if it is intended to lay the power cables and data cables simultaneously, or if the splicing of the three way casings 250, 260, and the tail 270 can be carried out under water, after the cables have been laid. As this is usually difficult to achieve, it is preferred that such splicing is carried out on the surface. One way to achieve this is to lay one of the cables first, with tails already attached to that first cable, and unattached at the other end of the tails. Then, when the other cable is laid, the tail lying underwater can be located, the free end raised to the surface and attached to the other cable, and then laid underwater. In this case it is preferable (though not essential) that the tail be long enough to have its free end raised to the surface without disturbing the rest of the first laid cable. Thus the tail could be anything from hundreds of meters to tens of kilometers, according the depth of water to fulfil this method.

FIG. 7

Figure 7:
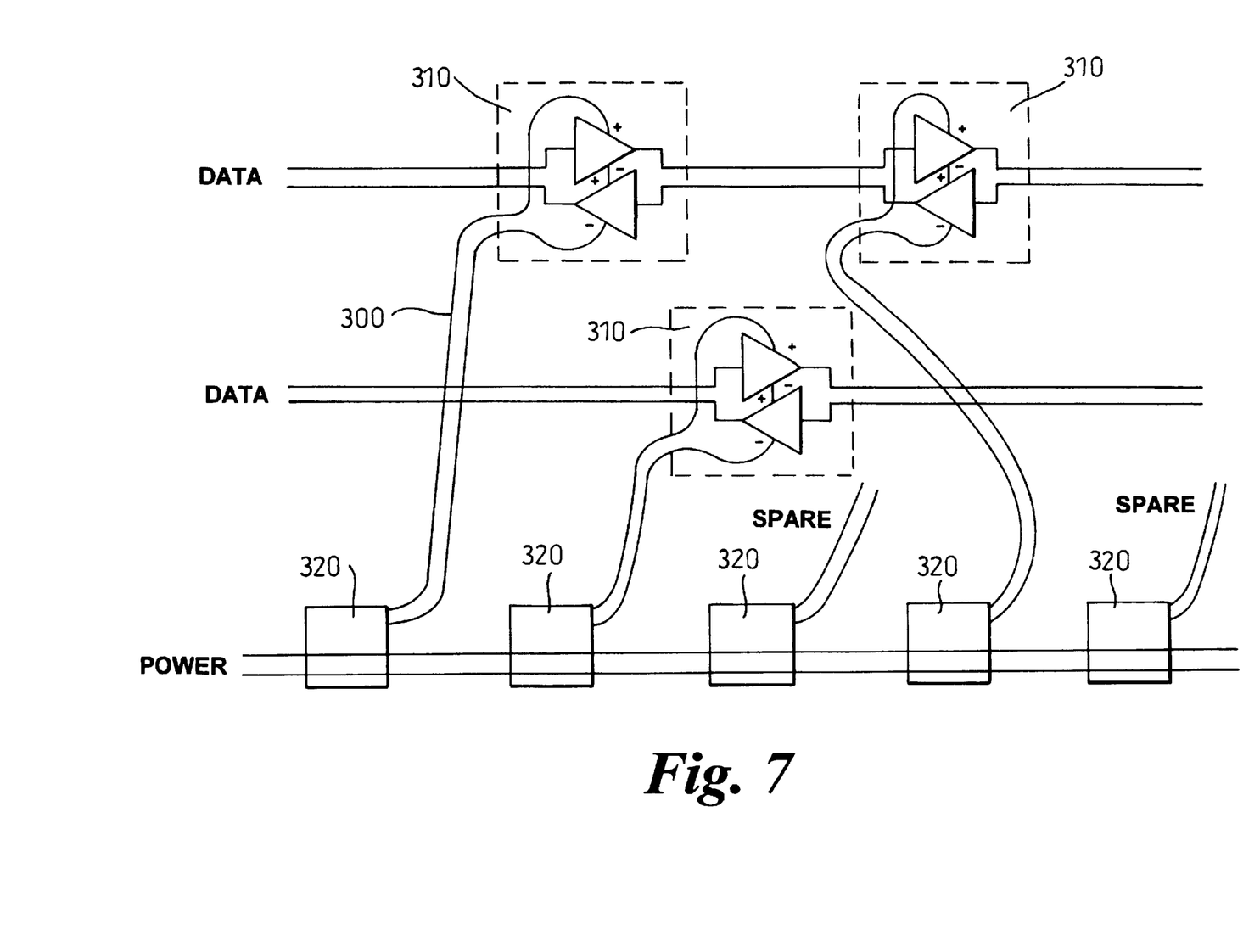
FIG. 7 shows another embodiment of the invention showing an arrangement for coupling a power cable to repeaters on more than one data cable, and showing junction boxes with tails on the power line.

FIG. 7 shows an arrangement in which the power routing is in the form of a trunk with branches. One branch 300 is shown for each of the repeaters 310. This enables the power cable to be laid and routed independently of the data cables. Thus the data cables need not supply any power, and can be made lighter, since no power conductor and no high voltage insulation is needed. In this case, a return current path is shown along each of the branches 300, back to a junction box 320 on the trunk power route.

As shown in FIG. 7, the power cable may be laid with a number of spare branches to enable more repeaters to be added later. The trunk power cable may have a single conductor, or may have two or more, to allow a return path as shown in FIG. 7.

Various arrangements of connectivity in the power network can be conceived. The junction boxes 320 could be arranged to couple each of the branches in series, or in parallel. If in parallel, then a return path would be needed, either within the same power cable, or another one (not shown).

The junction boxes 320 could have a straight forward passive connection, to act as a power splitter. Alternatively, active elements could be included, such as a switch, perhaps controlled remotely, or a voltage step-down function. As in terrestrial power transmission systems, this may be desirable to reduce the insulation requirements on the branches and the repeaters. If the trunk is DC, then the step-down function could be implemented by DC converters. These are well known and need not be described here in more detail. If the trunk is AC, then step-down can be carried out by transformers. AC to DC conversion would then be needed, either at the junction box, or at the repeater, for example, to supply low voltage DC to the repeater. Again, this could be implemented according to well known principles, and so no more details need be set out here.

Conventionally, DC transmission is used throughout underwater. It enables insulation requirements to be minimised for a given power capacity. However, in some cases, where there is a separate power cable to the data cable, AC supply provides some advantages. Firstly it enables the voltage to be stepped down more easily than is the case for DC supply. This means potentially, not only the data cables, but also the repeaters could be constructed without high voltage insulation. Furthermore, as AC can be inductively coupled, it is possible to construct waterproof power couplings without the need to splice cables to achieve connection of a conductor for a power supply along the cable. This could make installation much easier. Instead of dragging and raising a branch or tail cable to the surface for splicing, a waterproofing inductive coupling could be attached underwater. This could involve attaching free ends of cables together or attaching a cable to the outside of a repeater housing.

FIG. 8

Figure 8:
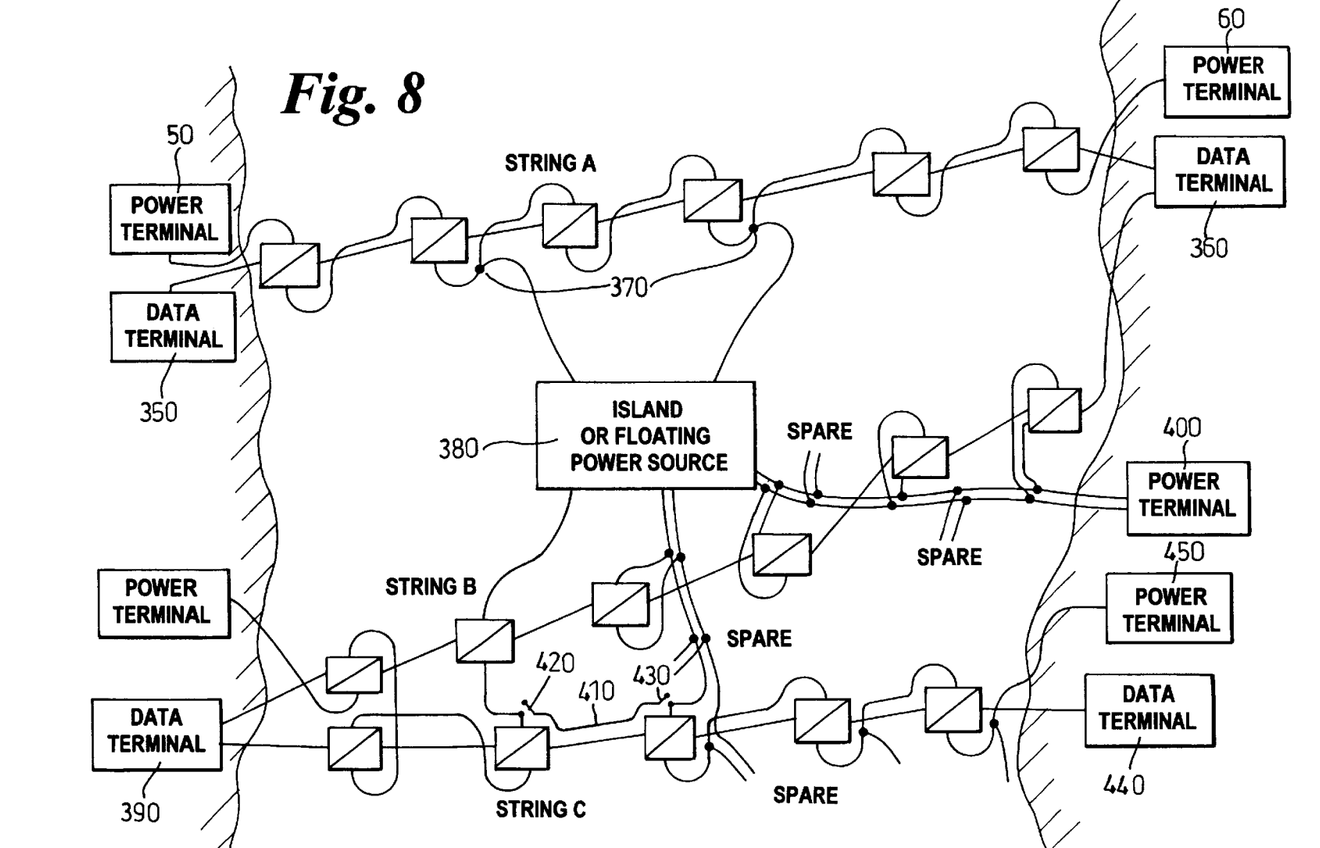
FIG. 8 shows another embodiment of the invention including a string of repeaters divided into substrings by power feeds at intermediate locations.

FIG. 8 shows three data cables each with a string of repeaters, extending between land based data terminals. Each has a power network for supplying the repeaters. A variety of different configurations for power supply are shown. These may be used individually or in combination.

String A extends between data terminal 350 and data terminal 360. Power is fed along the data cable, and supplemented at two intermediate locations 370 by separate power cables fed from an island or a floating power source 380. This arrangement is similar to that shown in FIG. 5 except three substrings are shown instead of two. The description above relating to FIG. 5 applies equally to this part of FIG. 8.

String B extends between data terminal 390 and data terminal 360. Each of the repeaters on this string are supplied individually from power cables routed separate from the data cable. Accordingly, no power is supplied along the data cable. The three repeaters closest to terminal 360 are supplied from branches off a power cable extending between the island or floating power source 380 and the power terminal 400. This cable includes a return path, coupled so that the repeaters are connected in parallel. It would be possible to have a power network in the form of a ring main, to give some redundancy against the possibility of a cable cut. Two spare branches are shown for future expansion, or for coupling more power to the existing repeater casings.

The three repeaters on string B closer to terminal 390 are coupled through power cables that supply both string B and string C. The two repeaters closest to terminal 390 are supplied by a power cable which has a single conductor, connecting the repeaters in series. The third closest of the repeaters is coupled on a branch from a two conductor cable.

These two power cables can be coupled together by a power link 410 which can be isolated by switches 420, 430 at each end. This enables these two power cables to feed current to one another if necessary, either to compensate for a fault condition, or to enable the current distribution in the networks to be altered to supply more repeaters or upgraded repeaters.

String C is effectively subdivided into two substrings. The two repeaters close to terminal 390 are powered by one power cable. The three repeaters closer to terminal 440 are coupled to a different power cable, extending between the island and floating power source 380, and power terminal 450. The cables supplying the two substrings are selectively coupled by the above mentioned link 410.

FIG. 9

Figure 9:
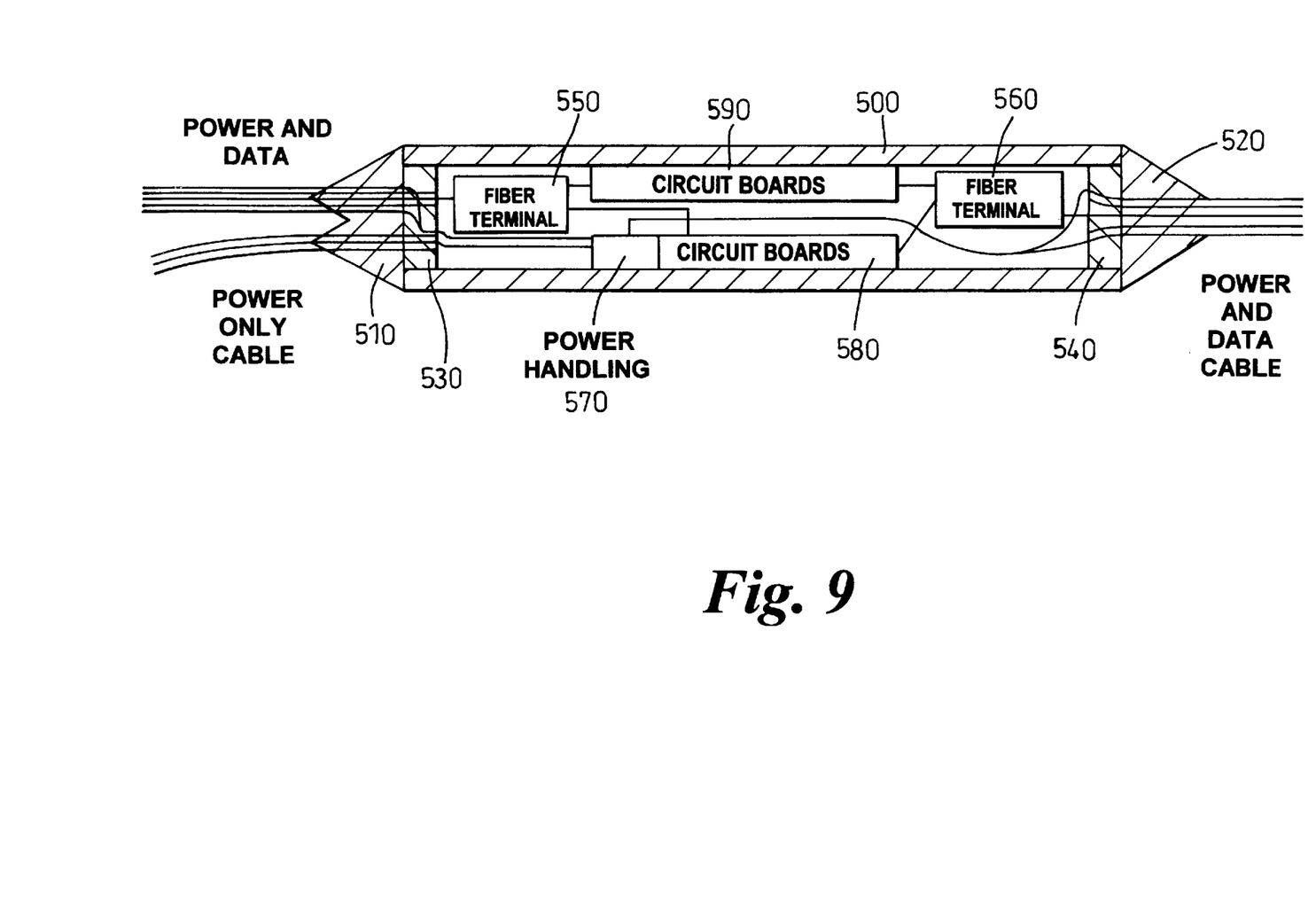
FIG. 9 shows a schematic cross section of an underwater repeater, for use in the arrangement of FIG. 6 for example

FIG. 9 shows in cross section in schematic form some of the important features of a typical underwater repeater having a three way casing. It can be used as the repeater 265 shown in FIG. 6. It has a cylindrical housing 500, strong enough to withstand high pressures underwater and traction or tension forces exerted on the cable while it is being laid or raised. One end has a power and data cable attached, the other end has two cables, one for power and data, the other for power only in this example. In a similar fashion, any of the configurations required for any of the repeaters shown in the preceding figures can be achieved.

Strain relief boots 510, 520 are provided at each end. The cables are provided with steel strength members which are terminated on strong end plugs 530, 540 securely attached to the housing. Apertures are provided in these end plugs to enable the power conductors and the data carrying optical fibres to be passed into the interior of the housing. This must be achieved without allowing any water ingress into the housing.

Inside the housing fibre terminals 550, 560 are provided to facilitate splicing of the optical fibres and to provide for longitudinal movement of the optical fibre to reduce tensile stress on the fibre as the cable is stressed.

The power conductors are fed to power handling circuit boards 570, where the above mentioned functions of switching, voltage step-down, AC to DC conversion and so on, may be carried out, depending on the power network configuration. Power grooming functions may also be needed here, such as surge suppression, voltage and current control and noise suppression, for example. Data handling functions are carried out on circuit boards 580, 590. Typically these are mounted on trays that can be slid longitudinally in and out of the housing. They are usually located so as to use the housing for thermal dissipation.

FIG. 10

Figure 10:
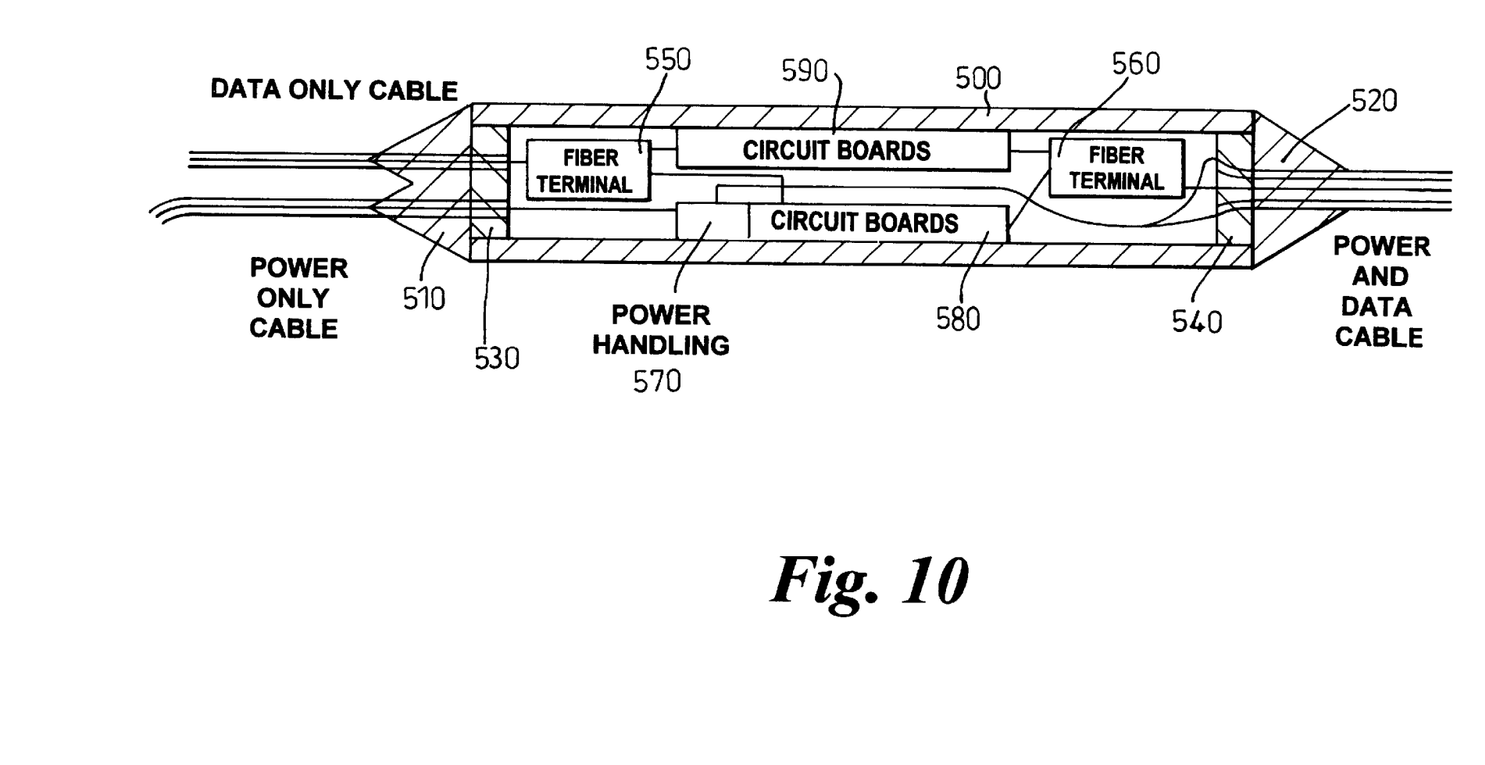
FIG. 10 shows a schematic cross section of another underwater repeater, for use in the arrangement of FIG. 6 for example

FIG. 10 shows a similar repeater to that of FIG. 9, but with no power branch. Corresponding reference numerals have been used. At one end of the repeater, the data cable carries power also, while at the other end, it is data only, no power. Accordingly, there is no power branch. This arrangement could be used for the repeater 260 of FIG. 6.

FIG. 11

Figure 11:
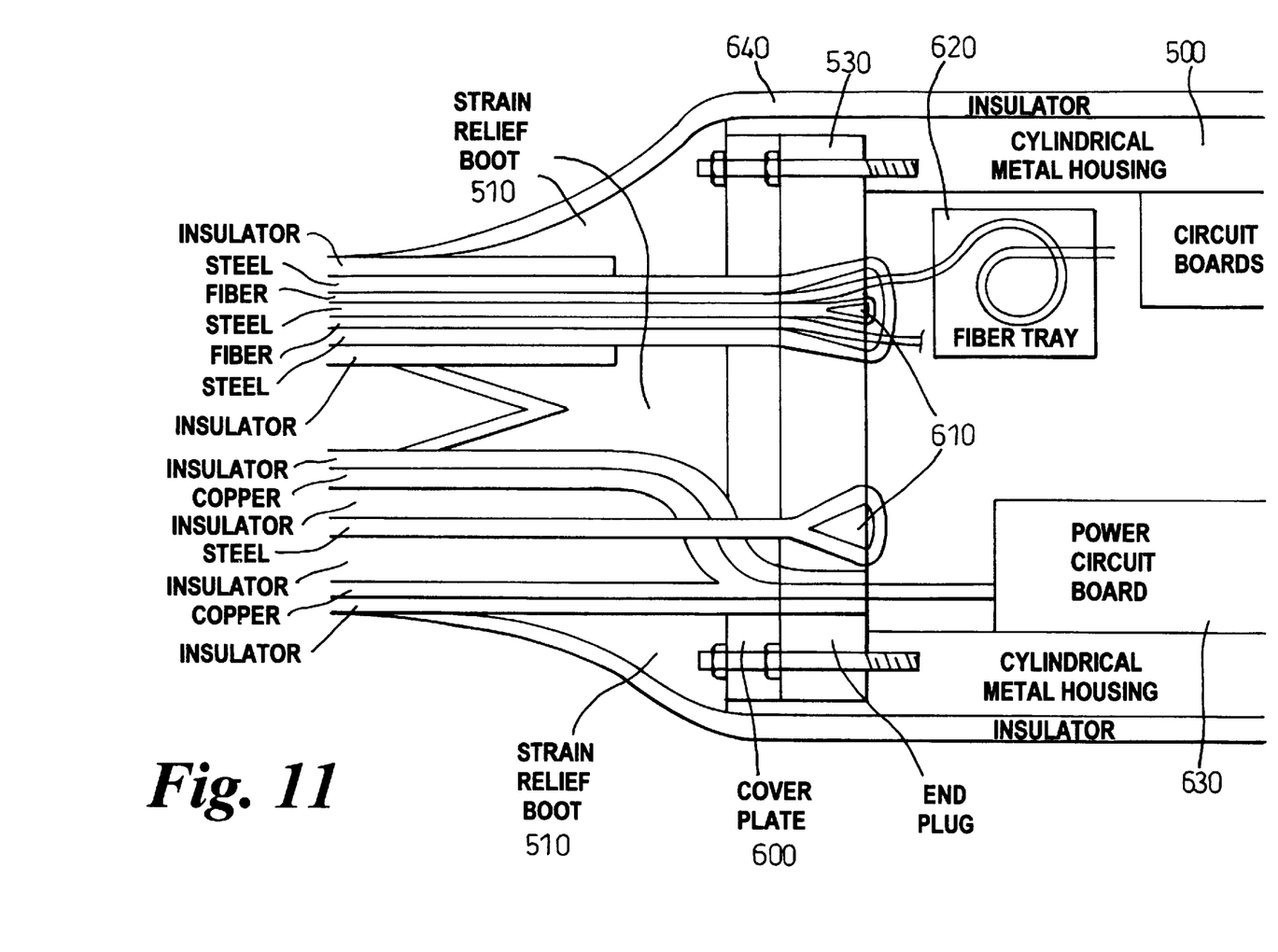
FIG. 11 shows a branching end of the repeater of FIG. 10 in more detail.

FIG. 11 shows in more detail the structure of one end of the three way casing for the repeater shown in FIG. 10. Where appropriate, the same reference numerals have been used as in FIG. 10. It shows two cables being attached to the end of the casing. A first cable is for data only. A second cable is for power only. The first cable includes a steel "kingwire" surrounded by a number of data carrying optical fibres. Together, these form the fibre-optical "core" of the cable. This core is itself surrounded by steel strength members. Finally the assembly is surrounded by an insulating layer, which may include an inner thin copper jacket, and an outer polyethylene jacket. The purpose of the insulating layer is not for electrical insulation, but for protection of the steel against corrosion by sea water.

The steel parts are securely anchored on to the end plug 530. This end plug is securely bolted to the cylindrical metal housing 500, and is strong enough to withstand the tensile forces on the cable as it is being made, and the water pressure when submerged. To help waterproof the end plug, a cover plate 600 is provided over the end plug. This may be made of lead.

The steel strength members of the cables can be secured to the end plug in various ways. In the method illustrated in FIG. 10, the apertures in the end plug are tapered on the inside, and the steel members are wrapped over a correspondingly tapered wedged 610, so that tension on the steel member causes the wedge to be pulled in to the tapered region, and grip the steel member between the wedge and the tapered aperture in the end plug.

The optical fibres are separated from the kingwire and pass freely through an aperture in the end plug and the steel terminating arrangement, to reach a fibre tray 620. This needs to allow for longitudinal movement in the fibre along the cable, either by providing room for slack coils of fibre or by making the fibre tray slideable longitudinally along the housing.

From the power cable, the copper power conductors are separated from the steel strength members, and fed through the end plug, insulated from the end plug, to reach the power circuit board 630. The entire housing may be coated with a watertight and electrically insulating external layer 640 made of polyethylene, or in a pre-moulded heat shrinkable jacket made of a material such as polyolefin.

Many variations in the structure shown in FIGS. 9 10 and 11 are known, and could be employed to suit the particular conditions of a particular environment, power network, and telecommunications system design. Amongst the notable features that differ from known techniques, there is the use of separate cables for power and data, or one cable for data and power, the other for power alone. This enables various different possible configurations for switching, voltage step-down, voltage conversion and so on, on the power board 630.

FIG. 12

Figure 12:
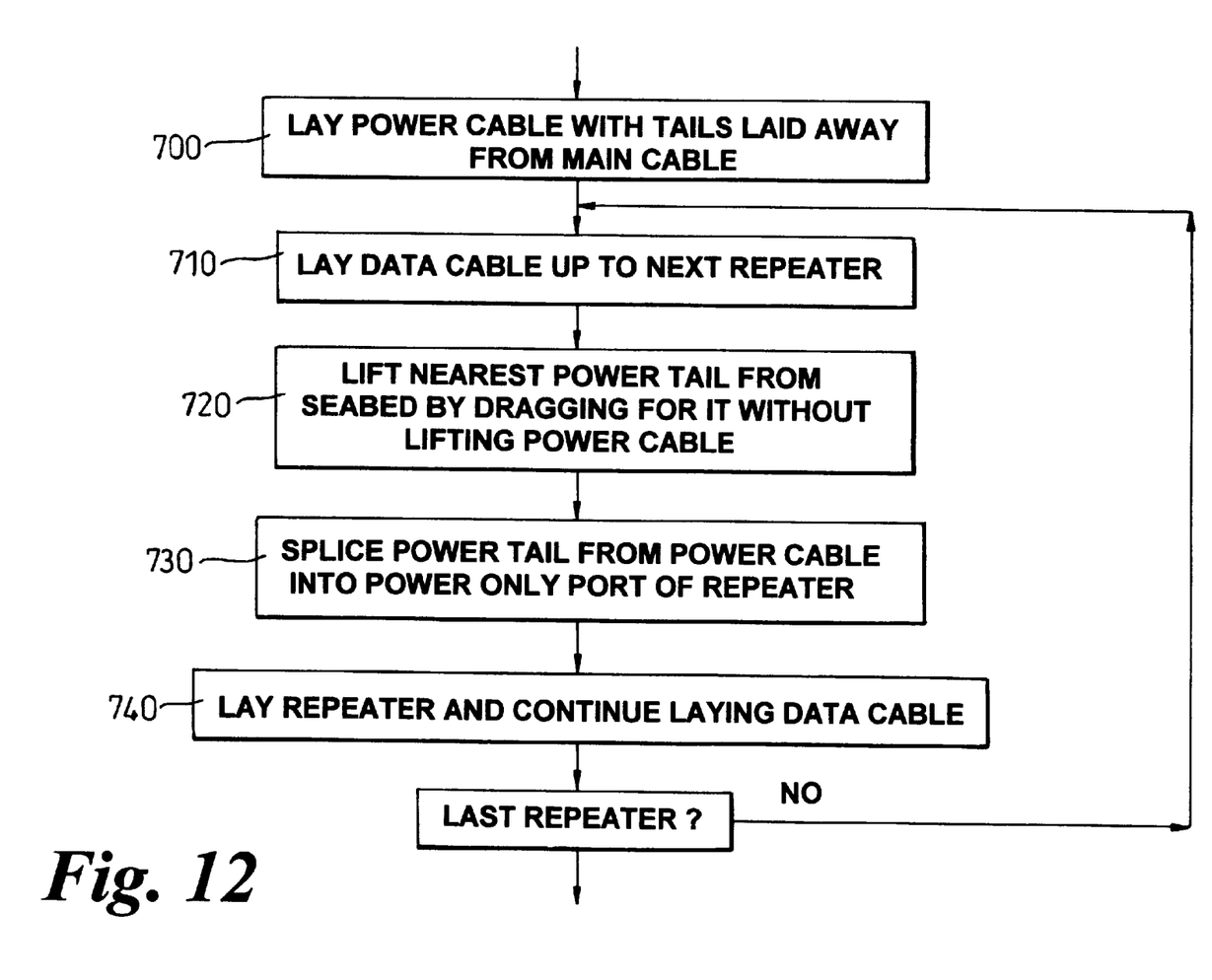
FIG. 12 shows another embodiment of the invention in the form of steps for installing the cables including the repeaters.

FIG. 12 shows an example of a procedure for laying the cables shown in preceding figures. The costs involved in laying the cable, by storing sections of it on a ship, laying it section by section, splicing in repeaters at intervals, may be a considerable proportion of the initial capital outlay. Accordingly, anything that makes this easier, or makes the system upgradable, so that more use can be made of that initial capital outlay, is beneficial. The ability to lay power cable and data cables separately, can bring such advantages. At step 700, the power cable is laid first, with tails laid away from the main cable. With modern navigation systems, it is easier to lay cable accurately. By laying the tails away from the main cable, it becomes possible to retrieve the free ends of the tails easily by dragging and lifting them.

Next, at step 710, the data cable is laid separately until the location of the next repeater. Before laying the section of cable where this repeater is located, step 720 is carried out. This involves lifting the nearest tail of the power cable. If the power cable is routed parallel to the data cable, as shown in FIG. 7 for example, the location of the repeaters may need to be tailored to be close to a particular junction box. If the power cable runs transverse to the data cable, as shown in FIG. 6 for example, then the repeater location could be arranged to be close to the point where the two cables cross over.

The free end of the tail is lifted by dragging across the known location of the tail until it is caught by the dragging hook. If this is impractical, because the water is too deep, other techniques, such as the use of remotely controlled submersible vehicles, may be more suitable.

Once the free end of the tail is lifted to the surface, at step 740, it is spliced into the repeater on the data cable laying ship. At step 750, the repeater is laid, and further subsequent sections of the data cable can be laid. The process can be repeated for each repeater, as shown by step 750, until the last repeater.

Other Variations and Concluding Remarks.

The invention has been described by way of example, and many other variations and examples will be apparent to a skilled person, within the scope of the claims. Although illustrated with reference to repeaters, clearly corresponding techniques and features are applicable to providing power supply to other types of telecommunications equipment.

Although the method of laying cable was described using an example in which the power cable was laid first, clearly the order could be reversed, with the data cable being laid first, with tails attached, and these tails attached later to splitters in the power cable, when the power cable is laid.

References to a power network are intended to encompass a single power supply line from source through load to a sink, without branches, as well as arrangements with branches, or switched branches to or from multiple sources or multiple loads. It is also intended to encompass multiple supply lines from multiple sources not directly connected.

What is claimed is:

1. An underwater telecommunications system having a first underwater cable for carrying data traffic and power, one or more underwater repeaters coupled to the first cable, and an underwater power network having branching or switching of power supplies and being coupled to the repeaters for supplying power from a remote power source, to the repeaters, at least part of the power network extending along a second underwater cable, separate from the first cable, and part of the power network extending along the first cable, the system having a string of the repeaters at intervals along the first cable, the power network being coupled to divide the string into two or more separately powered substrings.

2. The system of claim 1, the cable for carrying the data having at least one optical fibre for carrying the data.

3. The system of claim 1, having a transmitting data terminal on land or surface at one end of the first cable, and a receiving data terminal on land or surface, at the other end.

4. The system of claim 1 arranged so that power supply in one substring can be supplemented or replaced by supplies for neighbouring substrings.

5. An underwater telecommunications system having two or more first underwater cables for carrying data traffic, one or more underwater repeaters coupled to the first cable, and an underwater power network having branching or switching of power supplies and being coupled to the repeaters for supplying power from a remote power source, to the repeaters, at least part of the power network extending along a second underwater cable, separate from the first cables, the second cable being coupled to supply power to repeaters in the data carrying cables.

6. An underwater telecommunications system having a first underwater cable for carrying data traffic, a string of two or more underwater repeaters at intervals along the first cable, and an underwater power network having branching or switching of power supplies and being coupled to the repeaters for supplying power from a remote power source, to the repeaters, at least part of the power network extending along a second underwater cable, separate from the first cable, the system further having a coupling arrangement for enabling power to be coupled from the second cable to the repeater or repeaters after either cable has been laid underwater.

7. The system of claim 6, the coupling arrangement comprising one or more tails branched off the first or the second cable.

8. An underwater telecommunications system having a first underwater cable for carrying data traffic and power, a string of two or more underwater repeaters at intervals along the first cable, and an underwater power network having branching or switching of power supplies and being coupled to the repeaters for supplying power from a remote power source, to the repeaters, at least part of the power network extending along a second underwater cable, separate from the first cable, arranged such that at least some of the repeaters are coupled to the second cable to receive all their power from the second cable, and others of the repeaters are supplied with power from one end of the first cable, such that no power need be transmitted along at least those parts of the first cable adjacent to the repeaters supplied only from the second cable.

9. The system of claim 8, the second cable having a series of junction boxes at intervals, arranged to allow more repeaters to be coupled after installation of the second cable.

10. An underwater telecommunications system having a first underwater cable for carrying data traffic, one or more underwater repeaters coupled to the first cable, and an underwater power network having branching or switching of power supplies and being coupled to the repeaters for supplying power from a remote power source, to the repeaters, at least part of the power network extending along a second underwater cable, separate from the first cable, the power network being coupled at two or more locations to power the repeaters, and arranged to provide redundancy such that a failure of supply can be compensated by adjusting the power supply at any of the two or more locations.

11. The underwater power network for supplying power to underwater repeaters of the telecommunication system of claim 1, the power network comprising a power terminal on land or surface, and the second cable extending underwater from the power terminal, separate from the first cable for carrying data, and having coupling assemblies for coupling power to the repeaters.

12. The power network of claim 11, the second cable being arranged to supply power to repeater on two or more cables carrying data traffic.

13. The power network of claim 11 having further cables for supplying power to locations along the first cable not supplied by the second cable.

14. An underwater telecommunications system having a first underwater cable for carrying data traffic, a power network extending along at least a second underwater cable, one or more underwater repeaters coupled to the first cable, and one or more power couplers for coupling the second underwater cable to supply power from a remote power source to the repeaters, the power network being arranged to branch or switch to the underwater repeaters.

15. The system of claim 14, the power couplers comprising a tail extending from the repeater, for splicing to the second underwater cable.

* * * * *